Patented Mar. 2, 1926.

1,575,217

UNITED STATES PATENT OFFICE.

JOHN AUGUSTUS LAHEY, OF SEWAREN, NEW JERSEY, ASSIGNOR TO VULCAN DETINNING COMPANY, OF SEWAREN, NEW JERSEY, A CORPORATION OF NEW JERSEY.

SEPARATION AND RECOVERY OF ARSENIC AND/OR ANTIMONY AND TIN.

No Drawing.   Application filed May 6, 1925.   Serial No. 28,523.

*To all whom it may concern:*

Be it known that I, JOHN A. LAHEY, a citizen of the United States, residing at West Avenue, Sewaren, in the county of Middlesex, State of New Jersey, have invented certain new and useful Improvements in Separation and Recovery of Arsenic and/or Antimony and Tin; and I do hereby declare the following to be a full, clear, and exact description of the invention, such as will enable others skilled in the art to which it appertains to make and use the same.

This invention relates to the separation and recovery of arsenic and/or antimony and tin from materials containing the same, and has for its object the provision of an improved method of separating and recovering arsenic and/or antimony and tin from such materials. More particularly, the invention aims to effect the separation and recovery of arsenic and/or antimony and tin from materials in which these elements exist as oxysalts in combination with alkali hydrates or alkali carbonates, or both. A further object of the invention is the provision of an improved method of separating and recovering the tin from such materials as hereinbefore mentioned.

The invention is particularly applicable for the separation and recovery of arsenic and/or antimony and tin from materials resulting from the reclaiming or refining of metals, such for example as lead and other metals in storage battery plates. In such reclaiming or refining processes use is frequently made of molten fused caustic soda, or caustic soda and sodium carbonate, and a more or less solid mass results containing metallic particles (such as lead), oxysalts of arsenic and/or antimony and tin, and caustic soda or caustic soda and sodium carbonate, and frequently sodium chloride. The invention is not, however, restricted to the treatment of such mixtures as result from these metal reclaiming or refining processes, but is applicable generally to the treatment of any materials, such as ores, metallurgical or chemical products, containing arsenic and/or antimony and tin.

In accordance with the present invention the relatively insoluble oxysalts of antimony, if present, are first removed. The arsenic and tin are obtained in a common solution as oxysalts. The oxysalts of arsenic are separated by carefully controlled and regulated evaporation of the solution. The remaining solution is then further evaporated and the tin salts crystallized out. This fractional evaporation and crystallization of salts of arsenic and tin is a characteristic feature of the invention, and under careful control enables a substantially complete separation of the arsenic and tin. The tin salts are preferably redissolved in water and electrolyzed for the recovery at the cathode of metallic tin.

The aforementioned mixture contains the antimony (if present), arsenic and tin as oxysalts of these metals, that is as antimoniates, arsenates and stannates. If the arsenic and/or antimony and tin are not in the form of oxysalts, where the invention is applied to the treatment of other mixtures or materials, these salts of the metals are first formed, as for example by treatment with molten caustic soda, or in any other appropriate manner. In addition to the oxysalts of arsenic and/or antimony and tin, the mixture will usually contain caustic soda, sodium carbonate, and sodium chloride.

The more or less solid mass (containing the oxysalts of arsenic and/or antimony and tin together with caustic soda or sodium carbonate, or both) is agitated in an appropriate solvent such as water at a temperature of from about 70° C. to about 100° C. This treatment step is preferably carried out by charging the original material into screen baskets of sufficiently fine mesh to retain any metallic particles (such as metallic lead) but coarse enough to permit the escape with the solution of the relatively insoluble oxysalts of antimony. A sufficient amount of water should be used so that on cooling the oxysalts of arsenic will not crystallize.

The oxysalt of antimony, if present, will remain insoluble. The oxysalts of arsenic and tin as well as sodium hydroxid, sodium carbonate and sodium chloride, if present, will go into solution. This solution containing the oxysalt of antimony in suspension is removed from the dissolving tanks and filtered or permitted to settle. The solution may be removed from the sediment by decantation, or otherwise, and the antimony salt washed to remove further arsenic and tin.

The resulting filtered or decanted solution contains the arsenic, tin and alkali compounds. This solution is evaporated to a proper gravity and cooled. In accordance with the invention, the solution is evaporated until its gravity is such that substantially all of the arsenic will crystallize out when the solution is cooled to an appropriate temperature, say approximately 20° C., while the tin remains in solution. The arsenic will crystallize from the cooled solution in the form of an oxysalt of arsenic. The gravity to which the solution must be evaporated in order that the oxysalt of arsenic will crystallize out when the solution is cooled, while retaining the tin in solution, will depend upon the composition of the solution and must be determined on a test portion of the solution. If the steps of evaporating and cooling have been properly carried out substantially all of the arsenic will be removed from the solution and substantially all of the tin will remain in solution.

The solution containing the crystallized oxysalts of arsenic is now filtered and the oxysalts of arsenic dried on the filter by suction. Other appropriate means may, of course, be employed for separating the oxysalts of arsenic from the solution.

The remaining solution is next further evaporated, in a special evaporator. When the proper gravity has been reached substantially all of the tin will settle out of the solution in the form of sodium stannate. The point at which substantially all of the tin is removed from the solution depends upon the composition of the solution, and may be determined on a test portion of the solution. The sodium stannate is then removed from the solution by filtration, or in any appropriate manner.

The solution now contains sodium hydroxid, sodium chlorid and possibly some sodium carbonate. If it is desirable the sodium hydroxid and sodium chlorid may be separated by any known means, such as evaporating and separating out the sodium chlorid. The salt (sodium chlorid) may be removed by filtration, and the sodium hydroxide in solution devoted to any suitable use.

The sodium stannate is dissolved in water and allowed to stand until any undissolved solids have settled out. The clear solution is then decanted and conducted to electrolyzing tanks or cells, where the tin is electrodeposited. The electrolyte (sodium stannate solution) is preferably circulated through the electrolyzing cells, and is preferably hot. Iron or other insoluble anodes and tin cathodes are preferably employed. If desired, iron or other insoluble cathodes may be employed. The tin will be electrodeposited upon the cathode as metallic tin. The spent electrolyte may, if desired, be evaporated for the recovery of the caustic soda therein.

I claim:

1. The improvement in separating arsenic and tin which comprises evaporating a solution containing the arsenic and tin in the form of oxysalts, cooling the solution and crystallizing out therefrom the oxysalts of arsenic while retaining the tin in solution, and recovering the tin from the remaining solution.

2. The improvement in separating arsenic and tin which comprises evaporating a solution containing the arsenic and tin in the form of oxysalts thereof until the gravity of the solution is such that substantially all of the arsenic will crystallize out when the solution is cooled while the tin will remain in solution, cooling the solution and thereby crystallizing out therefrom the oxysalt of arsenic while retaining the tin in solution, and recovering the tin from the remaining solution.

3. The improvement in separating arsenic and tin which comprises evaporating a solution containing the arsenic and tin in the form of oxysalts, cooling the solution and crystallizing out therefrom the oxysalt of arsenic while retaining the tin in solution, and subjecting the remaining solution to further evaporation in the course of which a salt of tin is separated therefrom.

4. The improvement in separating arsenic and tin which comprises evaporating a solution containing the arsenic and tin in the form of oxysalts thereof until the gravity of the solution is such that substantially all of the arsenic will crystallize out when the solution is cooled while the tin will remain in solution, cooling the solution and thereby crystallizing out therefrom the oxysalt of arsenic while retaining the tin in solution, and subjecting the remaining solution to further evaporation in the course of which a salt of tin is separated therefrom 5. The improvement in separating arsenic and tin which comprises evaporating a solution containing the arsenic and tin in the form of oxysalts, cooling the solution and crystallizing out therefrom the oxysalt of arsenic while retaining the tin in solution, subjecting the remaining solution to further evaporation in the course of which a salt of tin is separated therefrom, redissolving such separated salt of tin, and subjecting the resulting tin-bearing solution to electrolysis in the course of which tin is separated therefrom by electrodeposition.

6. The improvement in separating arsenic and tin which comprises evaporating a solution containing the arsenic and tin in the form of oxysalts thereof until the gravity of the solution is such that substantially all of the arsenic will crystallize out when the solution is cooled while the tin will remain in solution, cooling the solution and thereby crystallizing out therefrom the oxysalt of arsenic while retaining the tin in solution, subjecting the remaining solution to further evaporation in the course of which a salt of tin is separated therefrom, redissolving such separated salt of tin, and subjecting the resulting tin-bearing solution to electrolysis in the course of which tin is saparated therefrom by electrodeposition.

7. The improvement in separating arsenic and tin from materials containing the same which comprises treating the material for the solution of the arsenic and tin in the form of oxysalts thereof, removing the arsenic from the solution, subjecting the remaining solution to evaporation in the course of which a salt of tin is separated therefrom, redissolving said separated salt of tin, and subjecting the resulting tin-bearing solution to electrolysis in the course of which tin is separated therefrom by electrodeposition.

8. The improvement in separating arsenic and tin from materials containing the same which comprises treating the material for the solution of the arsenic and tin in the form of oxysalts thereof, separating the arsenic and tin from the solution by fractional evaporation and crystallization, subsequently dissolving the resulting salt of tin, and subjecting the resulting tin-bearing solution to electrolysis in the course of which tin is separated therefrom by electrodeposition.

9. The improvement in separating arsenic and tin from materials containing the same which comprises treating the material for the solution of the arsenic and tin in the form of oxysalts thereof, and separating the arsenic and tin from the solution by fractional evaporation and crystallization.

10. The improvement in separating arsenic and tin from materials containing the same which comprises treating the material for the solution of the arsenic and tin in the form of oxysalts thereof, evaporating the solution until the gravity thereof is such that substantially all of the arsenic will crystallize out when the solution is cooled while the tin will remain in solution, and cooling the solution and thereby crystallizing out therefrom the oxysalt of arsenic while retaining the tin in solution.

11. The improvement in separating arsenic and tin from materials containing the same which comprises treating the material for the solution of the arsenic and tin in the form of oxysalts thereof, evaporating the solution until the gravity thereof is such that substantially all of the arsenic will crystallize out when the solution is cooled while the tin will remain in solution, cooling the solution and thereby crystallizing out therefrom the oxysalt of arsenic while retaining the tin in solution, and subjecting the remaining solution to further evaporation in the course of which a salt of tin is separated therefrom.

12. The improvement in separating arsenic, antimony and tin from materials containing the same in conjunction with an alkali compound, which comprises treating the material with an appropriate solvent whereby the arsenic and tin are dissolved in the form of oxysalts thereof and the antimony remains undissolved in the form of an oxysalt thereof, separating the oxysalt of antimony from the solution, and separating the arsenic and tin from the resulting solution by fractional evaporation and crystallization.

13. The improvement in separating arsenic, antimony and tin from materials containing the same in conjunction with an alkali compound, which comprises treating the material with an appropriate solvent whereby the arsenic and tin are dissolved in the form of oxysalts thereof and the antimony remains undissolved in the form of an oxysalt thereof, separating the oxysalt of antimony from the solution, separating the arsenic and tin from the resulting solution by fractional evaporation and crystallization, subsequently dissolving the resulting salt of tin, and subjecting the resulting tin-bearing solution to electrolysis in the course of which tin is separated therefrom by electrodeposition.

14. The improvement in separating arsenic, antimony and tin from materials containing the same in conjunction with an alkali compound, which comprises treating the material with an appropriate solvent whereby the arsenic and tin are dissolved in the form of oxysalts thereof and the antimony remains undissolved in the form of an oxysalt thereof, separating the oxysalt of antimony from the solution, evaporating the resulting solution until the gravity thereof is such that substantially all of the arsenic will crystallize out when the solution is cooled while the tin will remain in solution, and cooling the solution and thereby crystallizing out therefrom the oxysalt of arsenic while retaining the tin in solution.

15. The improvement in separating arsenic, antimony and tin from materials containing the same in conjunction with an alkali compound, which comprises treating the material with an appropriate solvent whereby the arsenic and tin are dissolved in the form of oxysalts thereof and the antimony remains undissolved in the form of an oxysalt thereof, separating the oxysalt of antimony from the solution, evaporating the resulting solution until the gravity thereof is such that substantially all of the arsenic will crystallize out when the solution is cooled while the tin will remain in solution, cooling the solution and thereby crystallizing out therefrom the oxysalt of arsenic while retaining the tin in solution, and further evaporating the remaining solution and thereby crystallizing out therefrom a salt of tin.

16. The improvement in separating arsenic, antimony and tin from materials containing the same in conjunction with an alkali compound, which comprises treating the material with an appropriate solvent whereby the arsenic and tin are dissolved in the form of oxysalts thereof and the antimony remains undissolved in the form of an oxysalt thereof, separating the oxysalt of antimony from the solution, evaporating the resulting solution until the gravity thereof is such that substantially all of the arsenic will crystallize out when the solution is cooled while the tin will remain in solution, cooling the solution and thereby crystallizing out therefrom the oxysalt of arsenic while retaining the tin in solution, further evaporating the remaining solution and thereby crystallizing out therefrom a salt of tin, redissolving the resulting salt of tin, and subjecting the resulting tin-bearing solution to electrolysis in the course of which tin is separated therefrom by electrodeposition.

17. The improvement in separating antimony and tin from materials containing the same in conjunction with an alkali compound, which comprises treating the material with an appropriate solvent whereby the tin is dissolved in the form of an oxysalt thereof and the antimony remains undissolved in the form of an oxysalt thereof, separating the oxysalt of antimony from the solution, treating the resulting solution for the recovery of the oxysalt of tin therein, redissolving the recovered oxysalt of tin, and subjecting the resulting tin-bearing solution to electrolysis in the course of which tin is separated therefrom by electrodeposition.

In testimony whereof I affix my signature.

JOHN AUGUSTUS LAHEY.